(12) United States Patent
Quail (10) Patent No.: US 9,191,698 B2
(45) Date of Patent: Nov. 17, 2015

(54) COPY PROTECTION

(75) Inventor: Gavin Quail, Bingley (GB)

(73) Assignee: ECHOSTAR UK HOLDINGS LIMITED, Steeton (GB)

( * ) Notice: Subject to any disclaimer, the term of this patent is extended or adjusted under 35 U.S.C. 154(b) by 375 days.

(21) Appl. No.: 13/371,912

(22) Filed: Feb. 13, 2012

(65) Prior Publication Data

US 2012/0207342 A1 Aug. 16, 2012

(30) Foreign Application Priority Data

Feb. 15, 2011 (EP) .................................. 11154580

(51) Int. Cl.
| | |
|---|---|
| H04N 21/8358 | (2011.01) |
| H04N 21/435 | (2011.01) |
| H04N 21/235 | (2011.01) |
| H04N 21/2389 | (2011.01) |
| H04N 21/418 | (2011.01) |
| H04N 21/426 | (2011.01) |
| H04N 21/436 | (2011.01) |
| H04N 21/4385 | (2011.01) |
| H04N 21/4402 | (2011.01) |

(Continued)

(52) U.S. Cl.
CPC ........... *H04N 21/435* (2013.01); *H04N 21/235* (2013.01); *H04N 21/2389* (2013.01); *H04N 21/23892* (2013.01); *H04N 21/4182* (2013.01); *H04N 21/42684* (2013.01); *H04N 21/4385* (2013.01); *H04N 21/43615* (2013.01); *H04N 21/440218* (2013.01); *H04N 21/4532* (2013.01); *H04N 21/4623* (2013.01); *H04N 21/8358* (2013.01)

(58) Field of Classification Search
None
See application file for complete search history.

(56) References Cited

U.S. PATENT DOCUMENTS

| | | | |
|---|---|---|---|
| 5,214,508 | A | 5/1993 | Stevens |
| 5,771,075 | A | 6/1998 | Rim et al. |

(Continued)

FOREIGN PATENT DOCUMENTS

| | | |
|---|---|---|
| EP | 2490446 A1 | 8/2012 |
| WO | 99/65241 A1 | 12/1999 |

(Continued)

OTHER PUBLICATIONS

Extended European Search Report for EP 11 15 4580 dated Aug. 22, 2011, 8 pages.

(Continued)

*Primary Examiner* — Jon Chang
(74) *Attorney, Agent, or Firm* — Kilpatrick Townsend & Stockton LLP (57) ABSTRACT

A method is provided for transmitting media content from a media content receiving device such as a set-top-box to one or more user devices capable of displaying, storing or outputting the media content. The method includes receiving, at the set-top-box, media content encoded according to a particular format, embedding in the media content, while it is encoded according to the particular format, a watermark containing data identifying the set-top-box and then transmitting the watermarked media content to one or more user devices. Encoding a watermark while the content is encoded according the received format allows protection to be added and the content passed to other devices without having to decode the content first. The method may be implemented by a suitable media content receiving device operating a computer program. A corresponding apparatus for implementing the method is provided.

17 Claims, 5 Drawing Sheets

(51) Int. Cl.
*H04N 21/45* (2011.01)
*H04N 21/4623* (2011.01)

(56) References Cited

U.S. PATENT DOCUMENTS

| | | | |
|---|---|---|---|
| 5,892,843 A | 4/1999 | Zhou et al. | |
| 6,012,109 A | 1/2000 | Schultz | |
| 6,281,929 B1 | 8/2001 | Fimoff | |
| 6,912,315 B1* | 6/2005 | Wong et al. | 382/232 |
| 6,944,228 B1 | 9/2005 | Dakass et al. | |
| 7,957,561 B2 | 6/2011 | Joung et al. | |
| 8,570,379 B1 | 10/2013 | Valdez et al. | |
| 8,848,062 B2 | 9/2014 | Valdez et al. | |
| 2001/0117892 | 8/2001 | Barton et al. | |
| 2002/0021805 A1 | 2/2002 | Schumann et al. | |
| 2003/0177503 A1 | 9/2003 | Sull et al. | |
| 2008/0001950 A1 | 1/2008 | Lin et al. | |
| 2008/0137968 A1 | 6/2008 | Joung et al. | |
| 2008/0172747 A1* | 7/2008 | Hurtado et al. | 726/26 |
| 2008/0310722 A1 | 12/2008 | Daniels et al. | |
| 2009/0128633 A1 | 5/2009 | Chapman | |
| 2009/0248702 A1* | 10/2009 | Schwartz et al. | 707/10 |
| 2009/0290711 A1* | 11/2009 | Bloom et al. | 380/239 |
| 2010/0208891 A1 | 8/2010 | Folea et al. | |
| 2010/0232550 A1 | 9/2010 | Lee et al. | |
| 2010/0239226 A1 | 9/2010 | Mountain | |
| 2011/0126018 A1* | 5/2011 | Narsinh et al. | 713/176 |
| 2011/0311098 A1* | 12/2011 | Kim et al. | 382/100 |
| 2012/0328149 A1* | 12/2012 | Chen et al. | 382/100 |
| 2013/0170695 A1* | 7/2013 | Anan et al. | 382/100 |
| 2013/0259139 A1 | 10/2013 | Valdez et al. | |
| 2013/0301872 A1* | 11/2013 | Flaharty et al. | 382/100 |
| 2014/0098889 A1 | 4/2014 | Valdez et al. | |
| 2014/0362931 A1 | 12/2014 | Valdez et al. | |

FOREIGN PATENT DOCUMENTS

| | | |
|---|---|---|
| WO | 00/51348 A2 | 8/2000 |
| WO | 2004/029954 A1 | 4/2004 |
| WO | 2010/041208 A1 | 4/2010 |
| WO | 2013/148551 A1 | 10/2013 |
| WO | 2014/055321 A1 | 4/2014 |

OTHER PUBLICATIONS

Langelaar, G., et al., "Watermarking Digital Image and Video Data—A State-of-the-Art Overview," IEEE Signal Processing Magazine, Sep. 2000, vol. 17, Iss. 5, pp. 20-46.

International Search Report and Written Opinion mailed Dec. 12, 2013, PCT/US2013/061853, 11 pages.

International Search Report and Written Opinion mailed Jun. 10, 2013, PCT/US2013/033659, 16 pages.

U.S. Appl. No. 13/538,497 Non Final Office Action mailed Feb. 23, 2015, 42 pages.

International Preliminary Report on Patentability for PCT/US2013/033659 mailed Oct. 9, 2014, 9 pages.

U.S. Appl. No. 13/645,053 Notice of Allowance mailed Jul. 9, 2013, 15 pages.

U.S. Appl. No. 14/036,822 Notice of Allowance mailed May 27, 2014, 16 pages.

U.S. Appl. No. 14/036,822 Non Final Rejection mailed Jan. 6, 2014, 11 pages.

U.S. Appl. No. 14/469,730 Non Final Office Action mailed Oct. 20, 2014, 10 pages.

* cited by examiner

COPY PROTECTION

CROSS REFERENCES

This application claims priority from co-pending European Patent Application No. EP 11154580.2, filed Feb. 15, 2011, entitled "COPY PROTECTION," which is hereby incorporated by reference, as if set forth in full in this document, for all purposes.

TECHNICAL FIELD

Embodiments of the invention relate to a system and method for applying copy protection to content.

BACKGROUND OF THE INVENTION

Content providers, such as broadcasters who broadcast content, particularly media content containing video and/or audio are particularly concerned with preventing unauthorised distribution of their content. A particular problem comes from content receiving devices used by the end user or consumer, such as set-top-boxes. These devices receive broadcasts containing media content for displaying to the end user, for example on a television or other type of display. Often the user pays to receive the content, either on a regular subscription to receive particular channels, or perhaps as a one off pay-per-view event to view a particular program. Unscrupulous users may re-broadcast or otherwise make available this content to those who have not paid to view it.

A number of methods have been proposed for preventing or detecting a user re-broadcasting or forwarding content. Unfortunately these do not offer sufficient protection when the user is forwarding content from one device to another, using methods that will be elaborated on below. Without sufficient content copy protection in place, content providers may be reluctant to allow their content to be distributed using these techniques.

SUMMARY OF THE INVENTION

The invention is defined in the claims, to which reference is now directed. Advantageous features are set forth in the dependent claims.

Embodiments of the invention relate to protecting content sent from a user device and particularly user devices for receiving media content via broadcast, demodulating the broadcast signal, decoding said content and providing the content to a display such as a screen or other output device. An example of such a user device is a set-top-box, sometimes known as a digibox.

Embodiments of the invention may provide a method for transmitting media content from a media content receiving user device, such as a set-top-box, to one or more user devices capable of displaying, storing or outputting the media content. The method includes receiving, at the media content receiving device, media content encoded according to a particular format, such as MPEG-2 or MPEG-4. The media content may then be decoded, or re-encoded according to a different format, and output to a connected display device such as a television or a screen. Additionally, while the media content is encoded according to the received format, a watermark containing data identifying the user device is embedded, and the media content is then output or transmitted, without being decoded, with the watermark, to one or more other user devices. Advantageously, content may be transmitted from the receiving user device to the one or more other user devices according to the same format as received by the user device and before it is decoded for local viewing. Security is still maintained, since the transmitted content may be traced back to the user device.

Preferably the method includes decoding the received media content and outputting the decoded content to a display device, which is preferably a local display device that may be directly coupled to the media content receiving user device for local viewing. The step of outputting the watermarked media content to one or more user devices may further comprise outputting the watermarked media content, encoded according to the particular format, to a connection to a network and transmitting the content over the network to one or more user devices for display. Preferably, in some embodiments, the watermark is only applied to content being transmitted to other user devices, and not to content being sent to the local display device.

Preferably the user device receives additional data indicating the location of bits within the encoded media content that may be altered to embed the watermark. This allows only those bits that will not affect the quality of the media content, such as video or audio quality, to be altered when encoding or embedding the watermark. This data is preferably provided separately to the media content, such as in separate packets within the transport stream used to deliver the media content by broadcast.

Preferably the media content is provided directly from a demodulator to a watermark unit to apply the watermark, which is preferably embedded immediately after the media content is demodulated by the user device.

Preferably the method includes the step of determining the data identifying the set-top-box using unique data stored on the set-top-box, such as a serial number stored in a memory. Further, the unique data stored on the set-top-box may also include data identifying one or more user profiles, the method further comprising the step of determining which user profile is currently in use by the set-top-box and encoding data indicative of said user profile in the watermark.

The watermarked content is preferably transmitted to another user device on a local network according to Digital Living Network Alliance (DLNA) guidelines.

A corresponding media content receiving user device is also provided, being arranged to implement the above method. Preferably the user device is in the form of a set-top-box for receiving broadcast media content. The user device comprises a receiver for receiving broadcast media content according to a particular format, a decoder for decoding the media content for providing to a display and a memory for storing data identifying the user device. A watermark application unit is coupled to the memory and is arranged to embed in the media content a watermark containing data identifying the user device before the media content is decoded by the decoder. An output, such as a transmitter, is also provided for transmitting the watermarked media content to one or more user devices while it is encoded according to the received format.

The output for providing the watermarked media content to one or more user devices is preferably a connection to a network for providing the watermarked media content, encoded according to the received format, to the one or more user devices over the network. The media content receiving device also preferably further comprises an additional output (108) for providing the decoded media content to a display that may be directly coupled to the media content receiving user device for local viewing. Preferably, in some embodiments, the watermark application unit is configured to apply a watermark to content being transmitted to other user devices, and not to content being sent to the local display device.

Preferably the user device has a receiver for receiving data indicating the location of bits within the encoded media content that may be altered to embed the watermark. This receiver may be the same unit as used for receiving the media content. A memory is coupled to the receiver to store the data and the watermark application unit is coupled to the memory and arranged to use the stored data to embed the watermark by adjusting the specified bits.

The watermark application unit, which may be implemented as a computer program operating on the main processor, is preferably coupled to a communication line between the receiver and the decoder such that it receives the encoded media content before it is decoded, and is preferably arranged to receive decoded media content directly from the decoder. Preferably the user device includes a memory for storing data that uniquely identifies the set-top-box and the watermark application unit is coupled to this memory and arranged to use the stored data to embed information in the watermark that uniquely identifies the set-top-box.

The transmitter is preferably a connection to a network, and preferably to a local network such as a home network.

Embodiments of the invention may be implemented as a computer program which when executed on a user device comprising a receiver for receiving broadcast media content according to a particular format, a decoder for decoding the media content for providing to a display, a memory for storing data identifying the user device and a transmitter, causes it to undertake the method steps described herein. In particular, the computer program may be executed on a media content receiving device such as the one described herein.

The data that indicates the location of bits within the encoded media content that may be altered to embed the watermark is preferably generated by an encoder system located at the broadcasting head-end system. The head-end system therefore contains an encoder, for encoding media content for broadcast, and a recorder, for recording the location of bits in the transport stream that may be changed without noticeably altering the media content (such as the video picture or the audio), but that may be detected using watermarking methods. The recorder may determine the bits that can be altered based on a known watermarking algorithm. The encoder incorporates this data into the transport stream to provide it to the user device, or may provide it to the user device via the internet.

BRIEF DESCRIPTION OF THE DRAWINGS

Examples of the invention will now be described in more detail, with reference to the drawings in which.

DETAILED DESCRIPTION OF THE PREFERRED EMBODIMENTS

Figure 1:
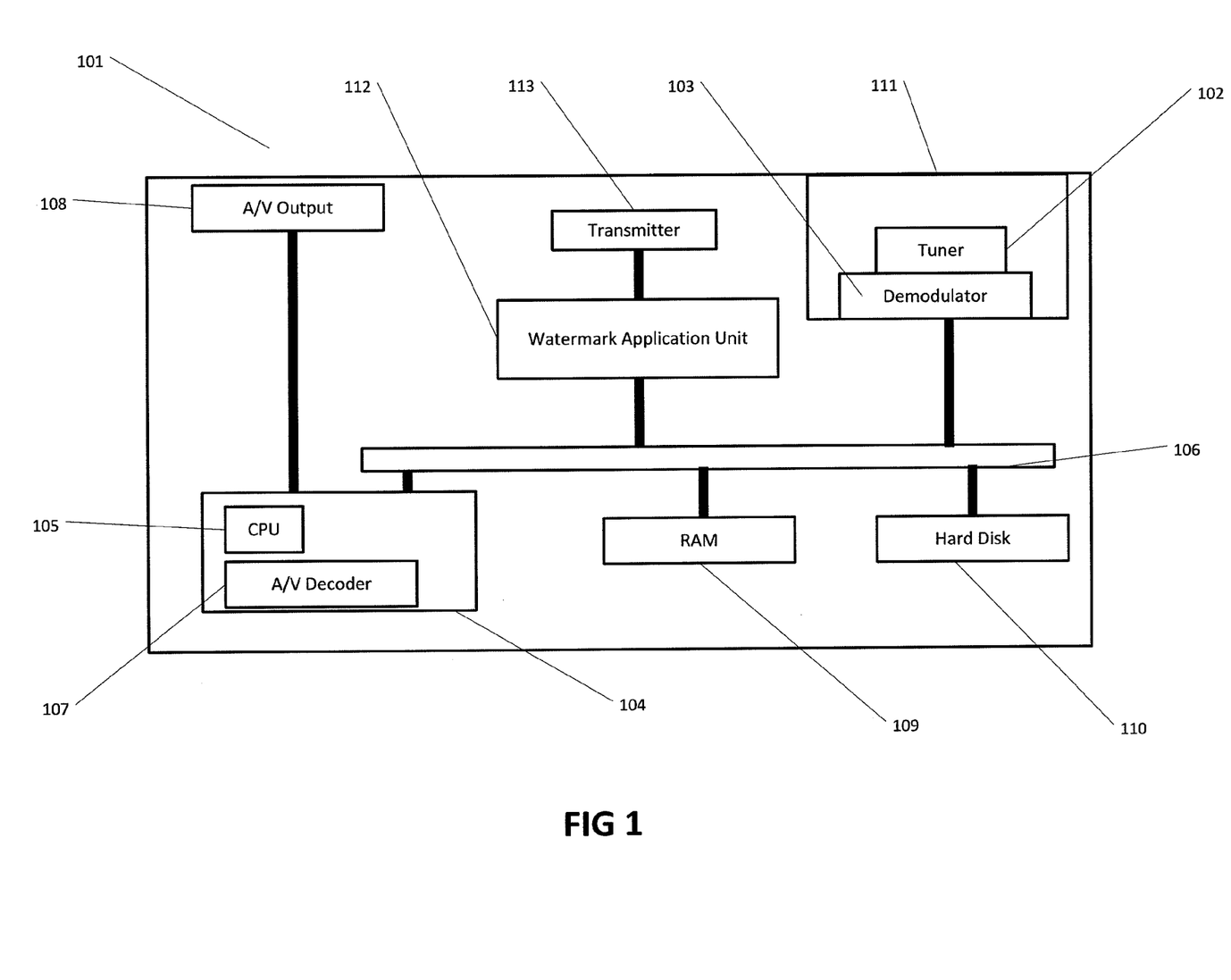
FIG. 1 is a diagram of a set-top-box according to an embodiment of the invention.

A first example of the invention may be implemented as a set-top-box of the sort shown in FIG. 1. The set-top-box 101 comprises a receiver 111 for receiving broadcast signals including encoded media content, such as video and audio content encoded according to a particular format. The media content is provided to a processor 104 for decoding and outputting the content. In the example of FIG. 1, the receiver includes a tuner 102 that tunes to and amplifies a particular analogue broadcast frequency, with the analogue transmission signal preferably containing a digital transport stream, although a digital arrangement could be used for receiving digital broadcasts. A demodulator, also included in the receiver, 103 extracts from the modulated broadcast signal, provided from the tuner, a digital data signal of a particular format that may be processed by the processor. The function of the receiver can therefore be considered to receive a broadcast signal and to extract from it a signal that may be processed by the processor. The set-top-box may be equipped to receive and process multiple broadcasts, for example by having tuner/demodulator packages that can each display/record a television channel simultaneously with the other channel.

The receiver is connected to a processor chip 104, comprising a CPU 105, by a bus 106. The main processor 104 of the set-top-box runs the set-top-box software and controls and coordinates the other set-top-box components. The AV decoder 107 is responsible for decoding the demodulated audio and video data. The AV decoder may instead be provided as separate audio and video decoders, both of which may be provided on the same physical chip as the CPU. The AV decoder receives and decodes the encoded signal provided by the demodulator. The signal typically comprises a program stream, or media content, encoded according to a particular format. The decoded audio/video signals are provided to the AV output, or AV control, 108, which provides an audio and video signal that can be connected to an output device or display device such as a television. The RAM 109 can be used by both the processor and the decoders. The hard disk 110 is optionally provided for storing recorded content for presentation at a later time.

The tuner receives broadcast media content via an input such as an aerial, satellite dish or cable input. The media content is broadcast in an encoded form, such as according to any of the MPEG standards. The AV unit outputs AV in any desired format compatible with the output device including component signal, composite signal, L+R audio, S/PDIF digital audio and/or HDMI according to the format to which the AV decoder converts it.

Set-top-boxes can include the functionality to insert or encode a watermark into media content once it has been decoded so that it is suitable for output to an output device such as a display. Watermarks, or digital watermarks, comprise data that is embedded into a digital signal that can be retrieved or discovered. Optionally, a secret key or code may be required to retrieve the watermark data. They are typically designed to be embedded in a way that is difficult to remove. Watermarks can be visible or invisible, although for media content, invisible watermarks are preferred, meaning those that are not perceived by the user or do not substantially impair the viewing experience. Watermarks can be used to prevent unauthorised copying of content. A device may retrieve the watermark from the media content before making a copy. The data contained within the watermark can be used to determine whether the device has permission to make a copy. Watermarks can also be encoded with data that specifically identifies a given device. For example, a set-top-box according to embodiments of the invention may be arranged to apply a watermark after decoding received content, and before the content is output to a display, to allow tracing of this content in the event it is illegally distributed.

It is also possible, in some set-top-boxes, to forward or transmit media content to one or more other devices for display. For example, a set-top-box may forward content to another set-top-box located in the user's home, or to a mobile device. This can be achieved over a local network. In particular, the user may have a home network to which the set-top-box and a plurality of other devices are connected. These devices may include displays, laptops, mobile phones, tablet computers or other mobile devices, as well as servers for storing content for later viewing.

A particular method for implementing such a system could employ the use of so called "DLNA" devices, that is devices that operate according to the standard interoperability guidelines set by the Digital Living Network Alliance, and particularly the DLNA Networked Device Interoperability Guidelines published in August 2009 which are incorporated herein by reference. Devices operating according to DLNA are able to discover one another on a home or local network using the Simple Service Discovery Protocol (SSDP), which allows devices to reveal their identification along with information detailing the functions they are capable of performing. Connected devices can then reveal lists of media content files available, based on the associated metadata. Content passed from one device to another is done so through the HTTP web protocol.

DLNA devices are typically classified as indicated below. There may be overlap between classifications:

Digital Media Server (DMS): These devices make content available to networked digital media players (DMP) and digital media renderers (DMR). A set-top-box according to the present invention can be considered a DMS, as can appropriately programmed personal computers and network attached storage (NAS) devices.

Digital Media Player (DMP): These devices find content on digital media servers (DMS) and provide playback and rendering capabilities. Examples include TVs, stereos and home theatres, wireless monitors and game consoles.

Digital Media Renderer (DMR): These devices play content received from a digital media controller (DMC), which will find content from a digital media server (DMS), Examples include TVs, audio/video receivers, video displays and remote speakers for music.

Digital Media Controller (DMC): These devices find content on digital media servers (DMS) and play it on digital media renderers (DMR). Examples include internet tablets, digital cameras and personal digital assistants (PDAs).

DLNA devices may also include mobile devices, typically classified as the following:

Mobile Digital Media Server (M-DMS): The mobile equivalent of a DMS, these wireless devices store content and make it available to wired/wireless networked mobile digital media players (M-DMP) and DMPs, DMCs and DMRs. Examples include mobile phones and portable music players.

Mobile Digital Media Player (M-DMP): These wireless devices find and play content on a digital media server (DMS) or mobile digital media server (M-DMS). Examples include mobile phones and mobile media tablets designed for viewing multimedia content.

Mobile Digital Media Uploader (M-DMU): These wireless devices send (upload) content to a digital media server (DMS) or mobile digital media server (M-DMS). Examples include mobile phones.

Mobile Digital Media Downloader (M-DMD): These wireless devices include a memory and find and store (download) content from a digital media server (DMS) or mobile digital media server (M-DMS). Examples include portable music players and mobile phones.

Mobile Digital Media Controller (M-DMC): These wireless devices find content on a digital media server (DMS) or mobile digital media server (M-DMS) and send it to digital media renderers (DMR). Examples include personal digital assistants (PDAs) mobile phones, wireless Internet tablets, Wi-Fi enabled digital cameras and so on.

Usually the DMS includes a memory, such as a hard drive, for storing content so that it can be distributed and viewed at a later time. A set-top-box without a hard drive could still be considered a DMS, for the purposes of embodiments of the present invention because it is able to distribute media content received by broadcast. However, it is clearly preferred that the set-top-box includes a memory, such as a hard drive, for storing content.

The DLNS standard requires content to be transferred between devices on a home network encoded according to a particular format. The format used can be any of the MPEG formats, particularly MPEG 2, MPEG 4 or MPEG 4AV for mobile devices. Audio can be encoded by, for example, LPCM (Linear pulse code modulation) or MP3.

In particular, the DLNS arrangement is capable of transferring media content between devices on the network according to the same format used to originally broadcast the content to the set-top-box. For example, media content may be broadcast by a service provider encoded as MPEG 2 or MPEG 4. As a result, in order to then transmit the media content to another user device for display or storage, the set-top-box does not need to decode and re-encode the media content between receiving and re-transmitting it. Of course, the same applies to any method or standard for transferring that data on a network that supports the same encoding format as received by the set-top-box via broadcast.

Referring back to FIG. 1, the set-top-box according to an embodiment of the invention includes, as well as the AV output, a transmitter 113. The transmitter is an additional output for providing content to other user devices. It may be a wireless transmitter, a cable connection or internet connection or any type of connection that allows media content to be output and transferred to another device. The transmitter is connected to bus 106 and arranged to receive encoded media content directly from the receiver so that this can be relayed or retransmitted according to the received format.

Located between the set-top-box receiver and the transmitter is a watermark application unit 112. This is a functional unit arranged to apply a digital watermark to the raw, encoded media content data stream, or transport stream. In particular, the watermark application unit may be arranged to apply a watermark to an MPEG encoded data stream. The watermark application unit receives any media content before it is passed to the transmitter such that any content being passed on by the transmitter has a watermark embedded in it.

The watermark is encoded with data indicative of the set-top-box. That is, the watermark includes data that uniquely identifies the set-top-box. This can be achieved by storing data on the set-top-box that uniquely identifies the particular device, such as a serial number, and encoding this number or data derived from this number, into the watermark.

In order to apply the watermark without corrupting the media content data or otherwise impairing the viewing experience of the end user the set-top-box is also arranged to receive additional data that indicates which bits within the transport stream data can be altered in order to encode the watermark. This additional data can be provided as separate packets within the transport stream from the broadcaster or via other transmission methods such as over the internet. The watermark application unit then adjusts the specified bits depending upon the ID of the specific set-top-box.

Arranging the watermark application unit such that the watermark is applied to the encoded transport stream, rather than the decoded media content, allows copyright protection to be applied when transmitting content to other devices in a network such as by DLNA. The transport stream is watermarked before it is retransmitted, and any retransmitted content can be traced back to the set-top-box that originally received the content. This allows broadcasters and content providers to retain a degree of control over the further distribution of media content, and prevents the potential security loophole of re-transmitting non-watermarked media content by rebroadcasting the encoded media before the watermark is applied.

Content being broadcast to set-top-boxes will often have security measures in place to prevent unauthorised recipients from accessing the content. Conditional access (CA) encryption techniques are well known. The broadcaster or head-end encrypts particular portions of the transport packets such that the content delivered by the broadcaster cannot be viewed without the correct access rights. In addition, the CA techniques add further data to the transport steam in the form of Entitlement Control Messages (ECM) and Entitlement Management Messages (EMM). Together these control the ability of users to watch scrambled content. The CA encryption is preferably removed from the encoded media stream before it is re-broadcast to other devices in accordance with embodiments of the present invention. The watermark may be added to the encoded media content before or after the CA security is removed, although it is preferred to do so after removal. Preferably the CA encryption is removed before any content is stored on a memory for later viewing.

Figure 2:
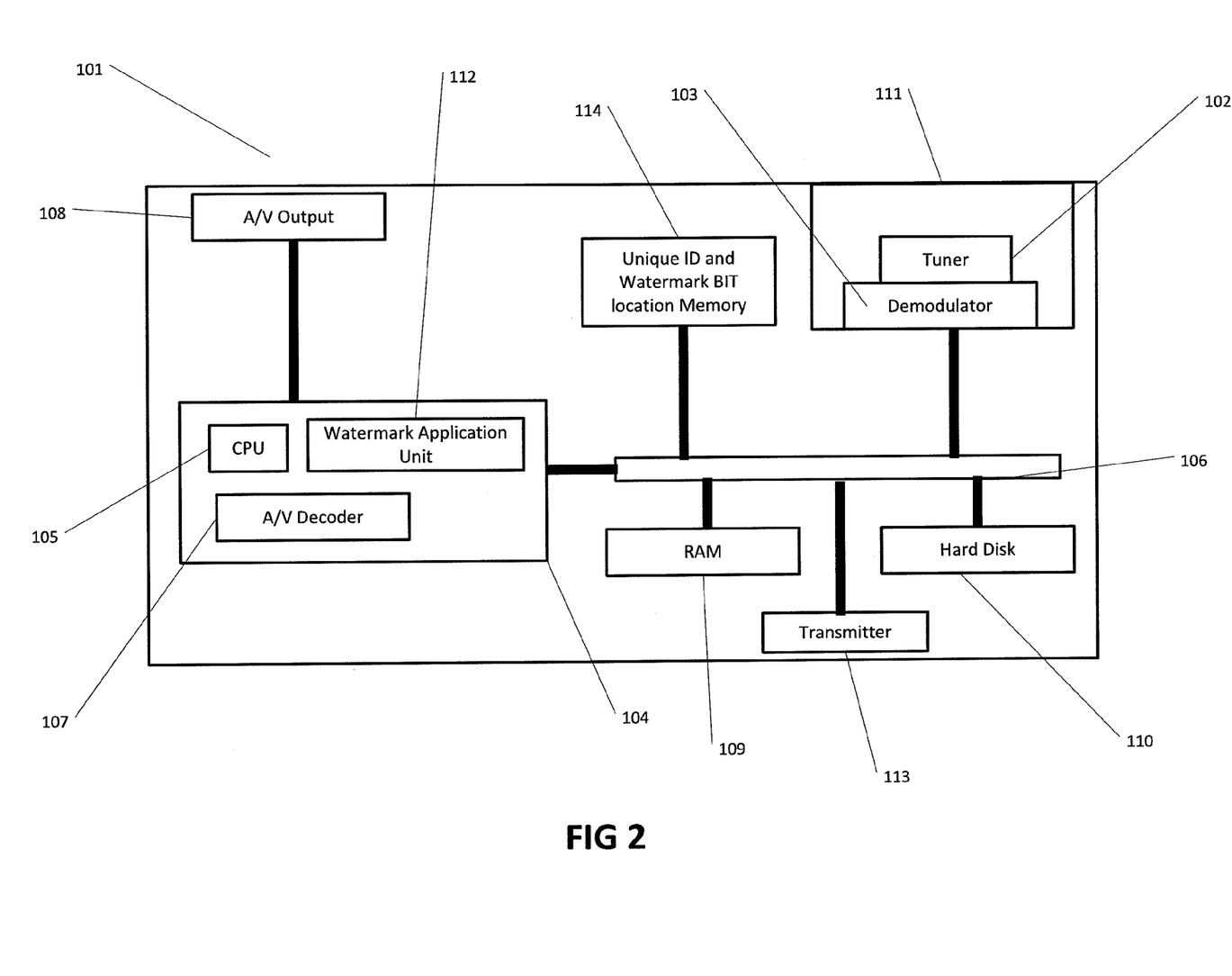
FIG. 2 is an additional diagram of a further example of an embodiment of the invention.

A further example of a set-top-box according to an embodiment of the invention is shown in FIG. 2. Like reference numerals are used with FIG. 1 for the same components and the description of common components will not be repeated here. In the example of FIG. 2 the watermark application unit is implemented as part of the processor 104, under the control of the main CPU 105. Although the watermark application unit is not located physically between the transmitter and the receiver, the system is functionally or logically arranged so that content cannot be passed to the transmitter until it has passed through the watermark application unit. In particular, the processor or main CPU controls signals so that no content can be provided to the transmitter until it has first been treated by the watermark application unit. Content may be provided to the decoder with or without a watermark applied. Although the watermark application unit may be implemented as a dedicated hardware unit, it may also be implemented in software executed by the CPU. When executed, the software performs the alteration of the preselected bits in the transport stream to introduce or encode the watermark.

As shown in FIG. 2, the set-top-box may include a memory 114 for storing the unique ID of the set-top-box and/or the location of the bits within the transport stream used to encode the watermark. This memory may be flash memory or any other suitable memory. It may instead be a portion of hard disk 110. Different memories may be provided for the unique ID and for the bit locations.

Figure 3:
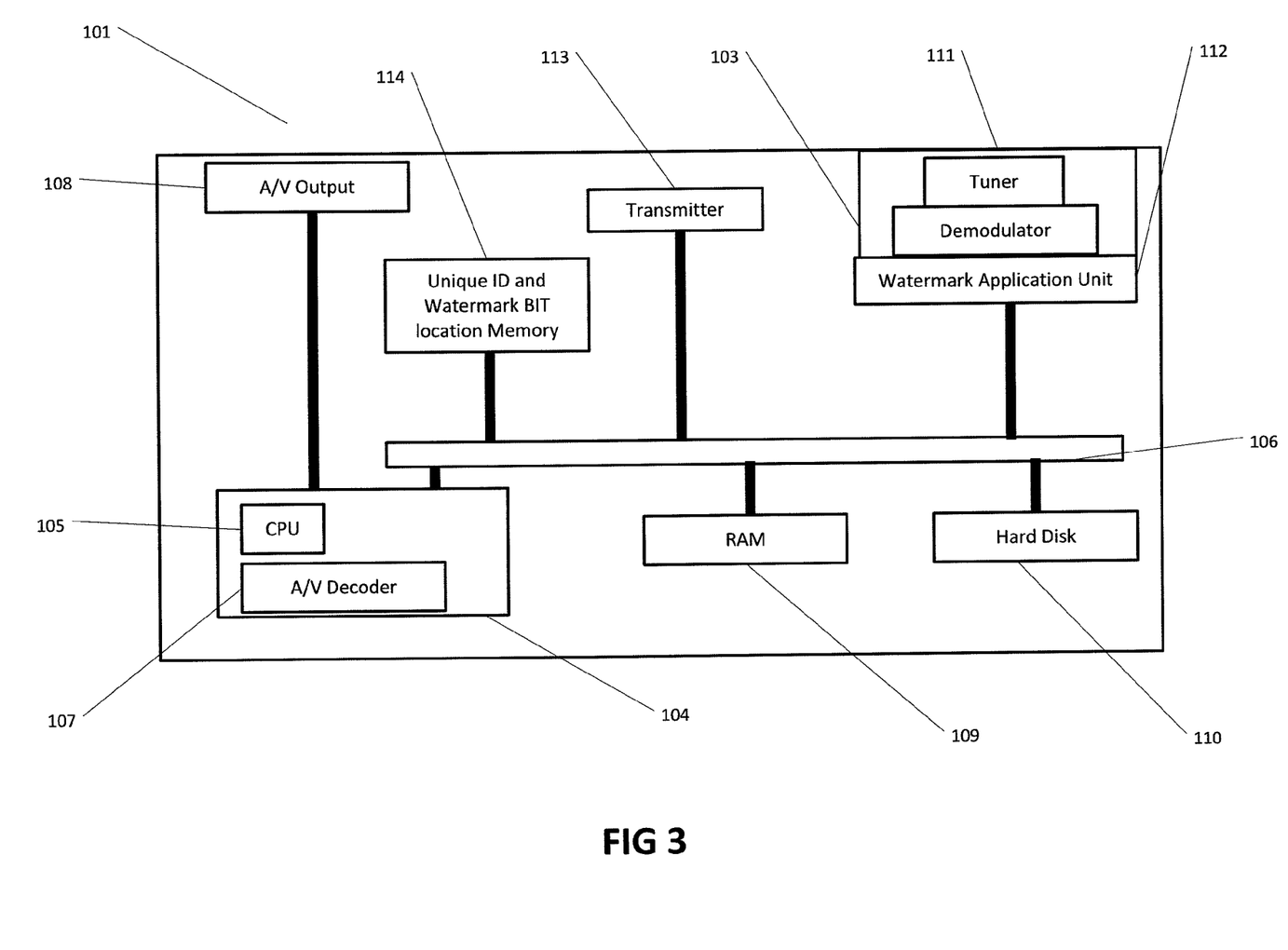
FIG. 3 is an additional diagram of a further example of an embodiment of the invention.

FIG. 3 shows a further example of a set-top-box configuration. Again, common reference numerals are used as with FIGS. 1 and 2. In the example of FIG. 3, the watermark application unit is located within the receiver unit 103 such that received encoded media content is provided to the watermark unit on reception, immediately after being demodulated. It is also possible for the demodulator itself to perform the function of the watermark application unit. A demodulator may comprise a dedicated functional unit or ASIC designed to receive and demodulate a broadcast transport stream. However, the demodulator may instead be configurable, for example comprising a suitable demodulator program operating on a general purpose processor, coupled to the necessary hardware, and arranged to receive the modulated signal and output a demodulated signal. Such a demodulator could be reprogrammed, via a software update for example, to add a watermark to the transport stream once it has been demodulated.

FIGS. 1, 2 and 3 all show a memory in the form of hard drive or hard disk 110. This memory is commonly provided in set-top-boxes to store content for later viewing, or for time delayed viewing, and, although an internal hard drive is preferred, the memory could be any of a multitude of storage devices including Flash devices or external storage of any form, including an external hard drive. Media content may be stored on the hard drive in encoded form, and particularly in the same format as was received by the receiver. The media content may be stored on the memory after the watermark is applied by the watermark application unit, particularly in arrangements such as FIG. 3 in which the watermark is applied just after demodulation.

In the arrangement of FIG. 1, where the watermark application unit is physically located in front of the transmitter, it would be preferable to store the content without watermark. In the arrangement of FIG. 2, either approach could be used.

Because embodiments of the invention allow a received and demodulated transport stream to be securely passed to another device, the storage of media content can be performed by an external device, rather than being restricted to an internal memory. In particular, instead of, or as well as having an internal storage device for storing media content (by storing the received and demodulated transport stream), a media content receiving user device according to embodiments of the invention can also pass the media content to an external device, in the manners described above and below, for subsequent storage. The external device may be a suitable, memory equipped, DMS, DMP, DMR, DMP, DMR, DMC, M-DMS, M-DMP, M-DMU, M-DMC and particularly an M-DMD or other mobile media player. This allows back-up copies or distributed storage of a user's media library whilst avoiding the issue of security, since the content can be traced back to the set-top-box that originally received and re-distributed the content.

In addition to the set-top-box storing data indentifying itself, such as an ID code or serial number, further indentifying data may be stored and used to encode further identification details in the watermark. In particular, set-top-boxes may have stored on them one or more user profiles. A user profile stores data particular to a given user, such as their name and certain preferences as is well known in the art. A user may log in to their profile when the set-top-box is turned on, or at some other time such as on request from the user. The watermark application unit may, therefore, encode in the watermark information identifying the currently logged in user of the set-top-box. The user profile information may be stored on the same or a different memory to the box ID data, and may be stored on the hard drive 110.

Figure 4:
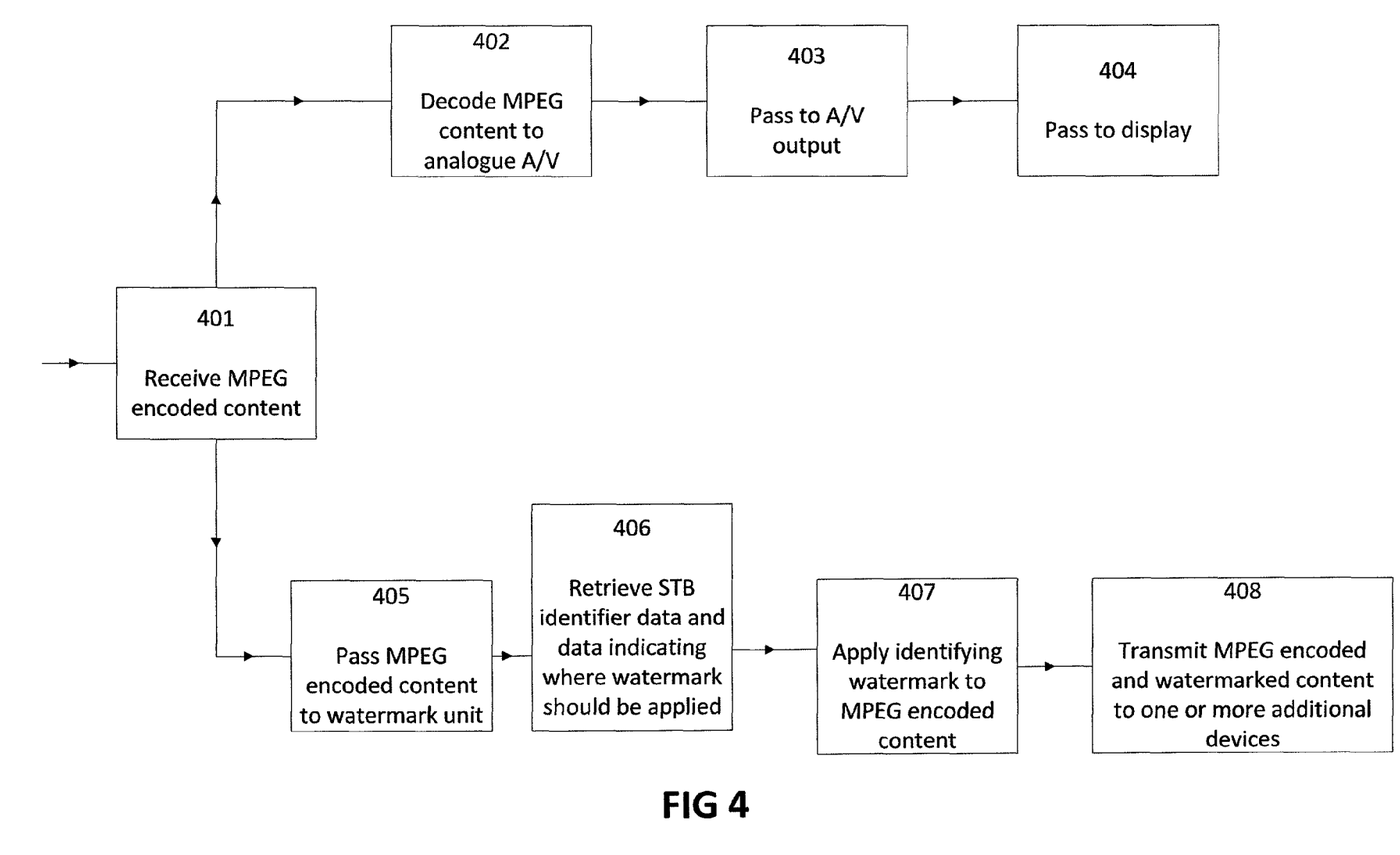
FIG. 4 is a flow diagram outlining an example method according to an embodiment of the invention.

FIG. 4 outlines a method for implementing embodiments of the invention. The method may be considered as the steps undertaken by a set-top-box appropriately configured or programmed to implement the invention. At step 401 the set-top-box receives the encoded media content, typically in the form of an MPEG encoded transport stream. This transport stream will usually need to be demodulated to extract the MPEG steam from the broadcast signal.

The demodulated transport stream is then decoded to an analogue AV signal, at step 402, before being passed to the AN output 403 and on to a display device at step 404 for display on, for example, a television screen. Watermarking may be applied between steps 402 and 403 to label the AV content as originating from the particular set-top-box. Additionally, the received, and demodulated, transport stream is passed to the watermark application unit at step 405. At step 406 the watermark application unit retrieves the set-top-box identifier and data indicating which bits of the transport stream can be altered to apply the watermark. Steps 405 and 406 may be swapped or performed at the same time. At step 407 the watermark is applied using the retrieved data. At step 408 the set-top-box may then transmit the watermarked transport stream to other user devices. Steps 405 to 408 may occur at the same time, or at a different time, to steps 402 to 404, and may be based on a copy of the encoded signal. As can be seen from FIG. 4, only the content being transmitted may be watermarked, without the content being decoded and output locally being watermarked.

Figure 5:
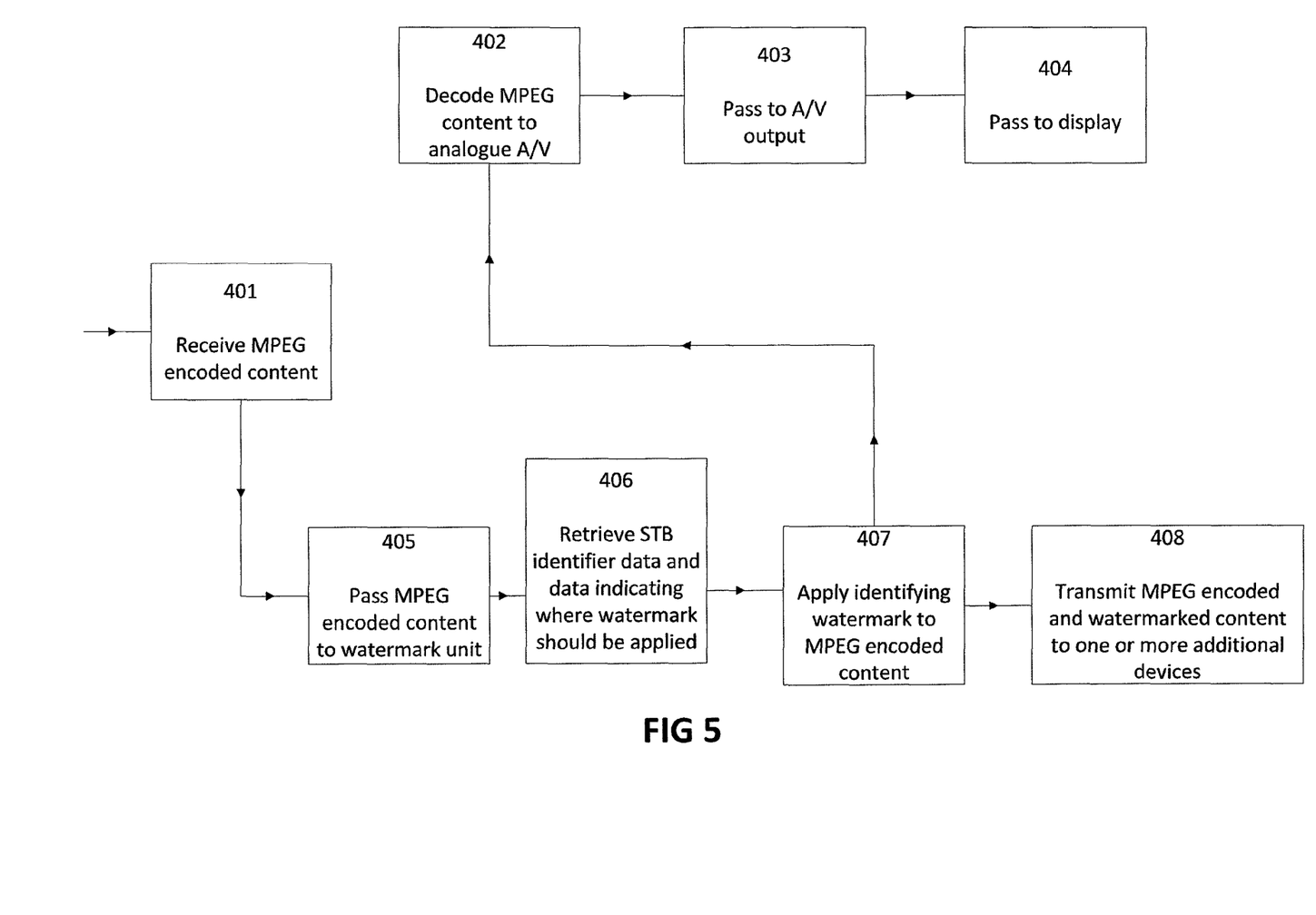
FIG. 5 is a flow diagram outlining an alternative example method according to an embodiment of the invention.

FIG. 5 shows a slightly altered method to FIG. 4, sharing the same steps, and the description of these steps will not be repeated. In the method of FIG. 5, encoded content has a watermark applied and the watermarked content is then provided to both the decoder, to enact steps 402 to 404, and to the transmitter to provide the watermarked content to other user devices.

The method may, in addition, include the step of providing the encoded media content to a memory, such as a hard drive, for storage. The content may be provided to the hard drive before or after the watermark is applied, i.e. between steps 401 and 405, or between steps 407 and 408. In addition, as described above, the storage of content can be performed on a suitable memory at the one or more additional devices.

Embodiments of the invention have been described in relation to set-top-boxes for receiving and descrambling broadcast video and accompanying audio data, particularly over the air. It will be appreciated that the term "set-top-box" may include any device able to impart the required functionality to a television receiver, whether provided in a standalone box, incorporated in a standalone box with other devices, or integrated within the television receiver. This would include televisions with inbuilt set-top-boxes, suitably programmed computers having the appropriate receiver functionality or connected to the internet or other network, mobile phones or similar mobile devices able to output media content, PDAs and so forth. The invention could also be applied to audio only devices such as radios, including digital radios.

The invention has been described in the context of receiving content by broadcast. The term "broadcasting" should also be taken to encapsulate delivery of data by any form such as over the air, via the internet, cable or satellite or any other type of transmission for providing content to a number of users. For the purposes of the present invention methods can also be considered to be contained within the term "broadcasting". Although specific examples have been given in relation to using DLNA, this is not a limitation and any method or standard for transmitting content over a network, particularly a home network, can be used provided the content is received via analogue or digital broadcast encoded according to a first format and can be retransmitted using the method or standard according to the same format.

The invention claimed is:

1. A method for transmitting media content, the method comprising the steps of:
   receiving, at a media content receiving device, media content encoded according to a particular format;
   logging in, by the media content receiving device, a user such that a user profile that is selected from a plurality of user profiles available on the media content receiving device is made active at the media content receiving device, wherein the selected user profile comprises information that identifies the user;
   determining data identifying the media content receiving device;
   embedding in the media content, while it is encoded according to the particular format, a watermark that comprises:
      data identifying the media content receiving device, and
      the information that identifies the user from the selected user profile that is currently active by virtue of the user having logged in on the media content receiving device; and
   outputting the watermarked media content to one or more user devices.

2. The method according to claim 1 further comprising:
   decoding the received media content and outputting the decoded content to a display device; and
   wherein the step of outputting the watermarked media content to one or more user devices further comprises:
   outputting the watermarked media content, encoded according to the particular format, to a connection to a network and transmitting the content over the network to one or more user devices for display.

3. The method according to claim 2 wherein the watermark is only applied to content being transmitted to other user devices, and not to content being sent to the display device.

4. The method according to claim 1, further comprising the step of receiving, at the media content receiving device, data indicating the location of bits within the encoded media content that may be altered to embed the watermark and altering these bits to embed the watermark.

5. The method according to claim 4 wherein the data indicating the location of bits within the encoded media content is provided separately to the media content receiving device.

6. The method according to claim 1, wherein the embedding of the watermark occurs directly after the received media content is demodulated by the media content receiving device.

7. The method according to claim 1, wherein the media content receiving device is a set-top-box and the particular format is an MPEG format.

8. The method according to claim 1, wherein the watermarked content is transmitted according to DLNA.

9. A media content receiving device for receiving broadcast media content comprising:
   a receiver for receiving broadcast media content according to a particular format;
   a processing system for logging in a user such that a user profile that is selected from a plurality of user profiles available on a memory of the media content receiving device is made active at the media content receiving device, wherein the selected user profile comprises information that identifies the user;
   a decoder for decoding the media content for providing to a display;
   the memory for storing data identifying the media content receiving device and for storing the plurality of user profiles;

a watermark application unit coupled to the memory and arranged to embed in the media content a watermark that comprises data identifying the media content receiving device and the information that identifies the user from the selected user profile that is currently active by virtue of the user having logged in on the media content receiving device; and an output for providing the watermarked media content to one or more user devices capable of displaying, storing or outputting the media content.

10. The media content receiving device according to claim 9 wherein:

the output for providing the watermarked media content to one or more user devices is a connection to a network for providing the watermarked media content, encoded according to the received format, to the one or more user devices over the network; the media content receiving device further comprising:

an additional output for providing the decoded media content to a display.

11. The media content receiving device according to claim 10 wherein the watermark application unit is configured to apply a watermark to media content being transmitted to the one or more user devices, and not to content being sent to a display device.

12. The media content receiving device according to claim 9, wherein the watermark application unit is configured to receive data indicating the location of bits within the media content that may be altered to embed the watermark; and the media content receiving device further comprises:

one or more memories coupled to the receiver to store said data, wherein the watermark application unit is coupled to the one or more memories and arranged to use the stored data to embed the watermark by adjusting the bits within the media content.

13. The media content receiving device according to claim 9, wherein the watermark application unit is coupled to a communication line between the receiver and the decoder such that it receives the encoded media content before it is decoded.

14. The media content receiving device according to claim 13 wherein the watermark application unit is arranged to receive demodulated media content directly from a demodulator.

15. The media content receiving device according to claim 9, further comprising one or more memories configured to store data that uniquely identifies the media content receiving device; wherein the watermark application unit is coupled to the one or more memories and arranged to use the stored data to embed information in the watermark that uniquely identifies the media content receiving device.

16. A set-top-box comprising a media content receiving device according to claim 9 wherein the particular format is an MPEG format.

17. A computer program product residing on a non-transitory processor-readable medium, the computer program product comprising processor-readable instructions configured to cause a processor to:

receive media content encoded according to a particular format;

determine data identifying the media content receiving device;

log in a user such that a user profile that is selected from a plurality of user profiles is made active, wherein the selected user profile comprises information that identifies the user;

embed in the media content, while it is encoded according to the particular format, a watermark that comprises data identifying the media content receiving device and the information that identifies the user from the selected user profile that is currently active by virtue of the user having logged in on the media content receiving device; and output the watermarked media content to one or more user devices.

* * * * *